(12) United States Patent
Roux et al.

(10) Patent No.: US 11,507,584 B2
(45) Date of Patent: Nov. 22, 2022

(54) LOGICAL PARTITIONS VIA HEADER-BASED PARTITION FILTERING

(71) Applicant: Oracle International Corporation, Redwood Shores, CA (US)

(72) Inventors: Benjamin Roux, Renton, WA (US); Jonathan Campbell Harkness, Woodinville, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 181 days.

(21) Appl. No.: 16/932,252

(22) Filed: Jul. 17, 2020

(65) Prior Publication Data
US 2022/0019591 A1  Jan. 20, 2022

(51) Int. Cl.
*G06F 16/00* (2019.01)
*G06F 16/2455* (2019.01)
*G06F 16/23* (2019.01)
*G06F 12/10* (2016.01)

(52) U.S. Cl.
CPC ........ *G06F 16/24568* (2019.01); *G06F 12/10* (2013.01); *G06F 16/2379* (2019.01); *G06F 2212/657* (2013.01)

(58) Field of Classification Search
None
See application file for complete search history.

(56) References Cited

U.S. PATENT DOCUMENTS

2017/0242887 A1* 8/2017 Zhao .................. G06F 9/5083
2020/0341986 A1* 10/2020 Yang ................ G06F 16/24568

* cited by examiner

*Primary Examiner* — Anhtai V Tran
(74) *Attorney, Agent, or Firm* — Kilpatrick Townsend & Stockton LLP

(57) ABSTRACT

Techniques for storing and processing large volumes of data by increasing the number of partitions that customers can allocate and use for their streams while minimizing the physical footprint of the partitions is disclosed. In certain examples, the stream partitions are created as different logical partitions on a physical partition in a physical storage cluster of a distributed message streaming system. The disclosed system provides an improved process for reading messages stored in different logical partitions of a physical partition by identifying partition chunks in a physical partition that comprise subsets of messages associated with a logical partition and filtering out partition chunks that do not contain messages associated with the logical partition. The disclosed system reduces the amount of the physical partition that needs to be read to retrieve messages stored in different logical partitions thereby improving the overall performance of the distributed message streaming system.

20 Claims, 8 Drawing Sheets

LOGICAL PARTITIONS VIA HEADER-BASED PARTITION FILTERING

BACKGROUND

Distributed streaming systems process streams of data, often in real time. These systems receive large volumes of data typically from external data sources such as sensor networks, stock trading or other financial networks, web traffic sources, network monitoring sources, gaming systems, Internet of Things (IoT) networks, and so on. The data generated by the data sources are typically unbounded sequences of messages that are received over long periods of time or even perpetually in some cases. Since large volumes of data are continuously being ingested, a distributed streaming system attempts to process and store the data using multiple computing nodes in a scalable and near real-time manner. For example, a distributed streaming system may implement a storage mechanism (e.g., Kafka) that enables the storage of information from data streams partitioned over multiple computing nodes (i.e., a physical cluster of machines). The partitioning of data streams over a physical cluster of machines allows data streams larger than the capability of any single machine to be processed. However, the physical clusters are generally limited by the number of partitions they can support and the amount of storage they can retain.

SUMMARY

This disclosure relates generally to techniques for storing and processing large volumes of data received from multiple data sources by increasing the number of partitions that customers can allocate and use for their streams while minimizing the physical footprint of the partitions.

In certain embodiments, a distributed message streaming system is disclosed. The method includes receiving a request to read messages from a message stream. The request specifies a message offset for reading the messages. The method includes identifying, based on the request, a logical partition associated with the message stream. The logical partition resides in a physical partition of a physical node and the physical node is comprised in a physical cluster of nodes in a distributed message streaming system. The method includes identifying, using the message offset and a summary index, at least one partition chunk on the physical partition that stores at least a subset of the messages, where the subset of messages is associated with the logical partition. The method includes obtaining the subset of messages stored in the partition chunk and transmitting the subset of messages to an application of the distributed message streaming system.

In certain embodiments, the method includes identifying a first partition chunk in the physical partition that stores the subset of messages associated with the logical partition. The method includes obtaining mapping information for a set of one or more partition chunks associated with the physical partition and identifying, using the summary index, the message offset and the mapping information, the first partition chunk in the physical partition that stores the subset of messages of the message stream associated with the logical partition.

In certain examples, the mapping information identifies, for a partition chunk in the set of one or more partition chunks associated with the physical partition, a set of one or more logical partitions within each partition chunk and a message offset range for a subset of messages stored within each logical partition.

In certain embodiments, the method includes determining that there are additional messages to be read in the message stream and identifying at least a second partition chunk in the physical partition that stores a subset of the additional messages associated with the logical partition based on the summary index and the mapping information.

In certain examples, the first partition chunk and the second partition chunk are not contiguous partition chunks stored in the physical partition.

In certain examples, the physical partition comprises a set of one or more partition chunks. Each partition chunk is composed of a set of one or more logical partitions. In certain examples, a first logical partition in the set of logical partitions in a partition chunk is different from a second logical partition in the set of logical partitions in the partition chunk.

In certain examples, the first logical partition stores a first subset of messages of the distributed message streaming system and the second logical partition stores a second subset of messages of the distributed message streaming system. In certain examples, the first subset of messages is different from the second subset of messages.

In certain examples, a partition chunk in the physical partition stores a minimum size of one or more contiguous subsets of messages of the plurality of messages in the message stream, where each message subset comprises messages between a range of message offsets.

In certain examples, the method further includes receiving a publish message request to publish a set of one or more messages in a message batch associated with the message stream, the publish message request received prior to the request to read the plurality of messages of the message stream. The method further includes identifying the logical partition associated with the message batch, identifying the physical partition on the physical node that is mapped to the logical partition, writing the set of one or more messages in the message batch to the physical partition and appending the message batch to the partition chunk in the physical partition.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
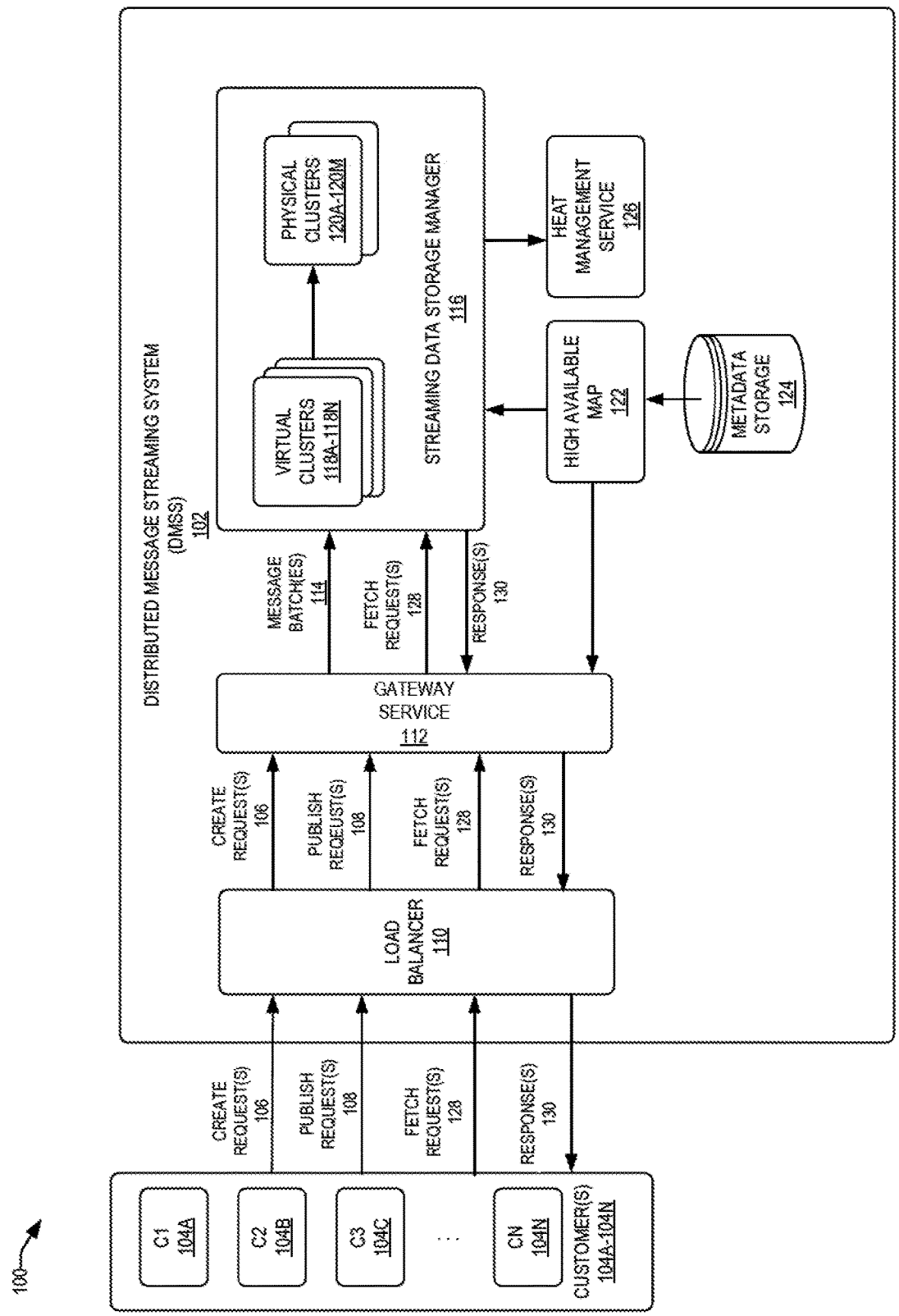
FIG. 1 depicts a simplified diagram of a computing environment that includes a distributed message streaming system (DMSS) including improved capabilities for storing and processing continuous high-volume streams of data in real-time, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In some examples, certain approaches for partitioning a stream across multiple storage clusters within a distributed streaming system are typically limited by the number of physical partitions that can be supported by the storage clusters (i.e., physical clusters) of the distributed streaming system. Each physical partition correlates to a physical reservation of hardware on a physical cluster and comes with certain throughput, storage retention and quality-of-service guarantees. While the number of physical partitions supported by a physical cluster can be increased by adding more hardware resources, each physical cluster is typically limited to a finite (e.g., 100) number of utilized physical partitions, after which increasing the number of partitions in the physical cluster can significantly degrade the performance of the distributed streaming system. The number of partitions that can be allocated on a physical cluster in turn places limits on the number of partitions that a customer of a distributed streaming system can create for a stream as part of the stream creation process.

Generally, customers can determine the number of partitions to be created for their streams based on a future target throughput they wish to achieve on any given partition. However, customers may not have enough data to predict future throughout requirements so, oftentimes, customers determine the number of partitions to be created for their streams based on their individual requirements, regardless of the actual volume of events emitted from their system. As an example, a customer may represent a business entity who manages a fleet of services. Each service may emit events indicating certain actions that have taken place or events indicating values that have changed within the system. Such a customer may wish to publish messages related to each event type to different partitions on the physical cluster so that each event type is handled by a different consumer within the distributed message streaming system. However, it is rare that each event type generates enough traffic to justify its own partition on a physical cluster based on throughput alone.

In another instance, a customer may represent a business entity that manages several hundred hotels and therefore wishes to create different partitions for messages received from each hotel. This results in the creation of a couple of thousand stream partitions on the physical clusters. However, each partition may only receive a few messages a day resulting in several under-utilized partitions within the distributed message streaming system. As another example, a customer may represent an internal customer of the distributed message streaming system that wants to use a stream-per-tenant semantic for their own multi-tenant service designs. This results in an arbitrarily large number of variably utilized streams and partitions. Assigning the desired number of partitions requested by customers in such cases can result in the generation under-utilized partitions and reduce the total overall capacity of the distributed message streaming system.

The various embodiments described in the present disclosure address the above deficiencies by disclosing a distributed message streaming system that includes improved capabilities for increasing the number of partitions that customers can allocate and use for their streams while minimizing the physical footprint of these partitions on the storage clusters. The disclosed approach enables a customer to create as many partitions for their streams as they desire without regard for utilizing those partitions by creating the partitions as different logical partitions on a physical partition in a physical cluster of the distributed message streaming system. Since each physical partition is now capable of supporting multiple lower throughput logical partitions, each physical cluster is capable of handling a larger number of partitions than what was capable with traditional physical clusters that have physical limitations on the number of partitions they can support, the amount of throughput they can handle and the amount of storage they can retain.

As used herein, a "physical partition" is used to refer to a unit of storage in a physical cluster for storing messages. Each "physical partition" comprises an immutable collection or sequence of messages. A "logical partition" is used to refer to a unit of storage on a physical partition in a physical cluster of nodes. A logical partition may have lower data storage capacity than the physical partition it is stored on. The amount of provisioned throughput from a logical partition may also be lower than a physical partition. In certain embodiments, a physical partition can comprise (i.e., be divided into) multiple logical partitions. In certain examples, messages having the same key may be published to the same logical partition on the physical partition. As used herein, the term "key" is used to refer to an identifier used to group/partition related messages in a message stream. For instance, the key can be an identifier that groups messages received from a particular customer of the distributed message streaming system.

In certain embodiments, the distributed message streaming system provides an improved and efficient process for reading messages stored on a logical partition within a physical partition. The distributed message streaming system can efficiently search for and identify partition chunks in a physical partition that comprise subsets of messages associated with a logical partition by filtering out partition chunks that do not contain messages associated with the logical partition. By using the disclosed technique, the distributed message streaming system is able to reduce the amount of the physical partition that needs to be read to retrieve messages stored in different logical partitions on a physical partition thereby improving the overall performance of the distributed message streaming system.

Referring now to the drawings, FIG. 1 depicts a simplified diagram of a computing environment 100 that includes a distributed message streaming system (DMSS) 102 including improved capabilities for storing and processing continuous high-volume streams of data in real-time, according to certain embodiments. DMSS 102 and its subsystems may be implemented using software (e.g., code, instructions, program) executed by one or more processors, hardware, or combinations thereof. The software may be stored on a non-transitory storage medium (e.g., on a memory device). DMSS 102 may be implemented by one or more computing systems. For example, one or more computing systems may execute the software (e.g., code, instructions, program) implementing DMSS 102. In the embodiment depicted in FIG. 1, DMSS 102 includes a load balancer 110, a gateway service 112, a streaming data storage manager 116, a high available map 122 and a heat management service 126. Portions of data or information used by or generated by DMSS 102 as part of its processing may be stored in streaming data storage manager 116 and metadata storage 124 of DMSS 102.

In certain embodiments, streaming data storage manager 116 comprises a pool of computing nodes that are configured to process and store large amounts of data (e.g., continuous message streams) in a scalable and near real-time manner. The pool of computing nodes comprise a virtual cluster of nodes 118A-118N and a physical cluster of nodes 120A-120M. Each physical cluster of nodes (e.g., 120A) is a distributed, partitioned, and replicated service that is run as a cluster of one or more nodes (servers), each of which is called a physical node (also referred to herein as a broker node). Each virtual cluster of nodes (e.g., 118A) comprises a set of one or more virtual nodes and resides within a physical node in a physical cluster of nodes (e.g., 120A). Additional details of the implementation of the physical nodes and virtual nodes within a physical cluster of nodes is discussed in detail in FIG. 2.

Figure 2:
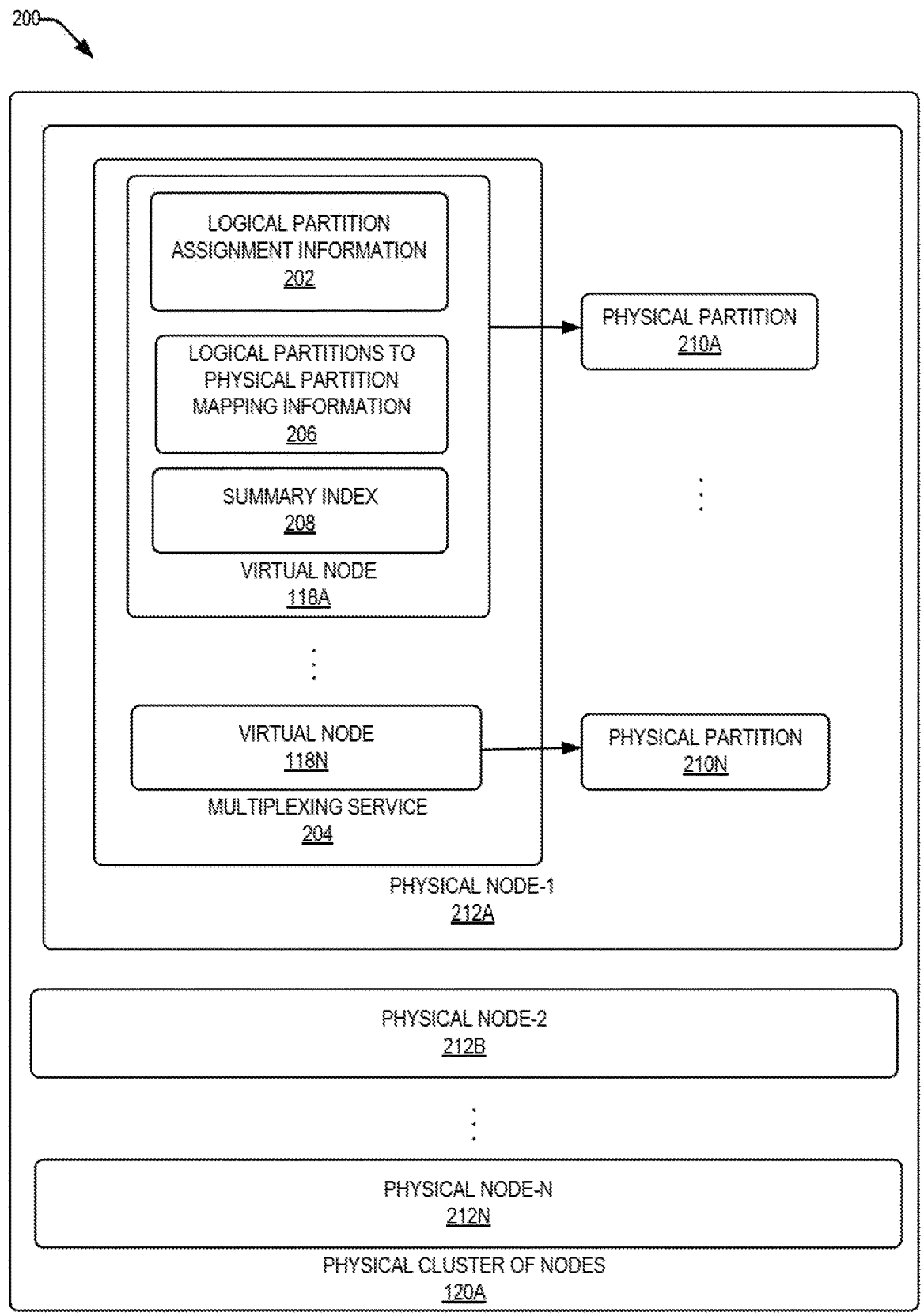
FIG. 2 depicts a simplified high level diagram of the implementation of a physical node in a physical cluster of nodes residing in the streaming data source manager illustrated in FIG. 1, according to certain embodiments.

FIG. 2 depicts a simplified high level diagram 200 of the implementation of a physical node in a physical cluster of nodes residing in the streaming data source manager illustrated in FIG. 1, according to certain embodiments. In certain embodiments, a physical cluster of nodes (e.g., 120A) comprises a set of one or more physical nodes 212A . . . 212N. Each physical node (e.g., 212A) comprises a set of one or more physical partitions 210A . . . 210N. A "physical partition" is used to refer to a unit of storage in a physical cluster for storing messages. The storage limit of a physical partition is based on a combination of factors such as its throughput, storage capacity and retention period of data (e.g., messages) written to the physical partition. As used herein, the "storage capacity" of a physical partition refers to the amount of data (messages) that can be retained in a physical partition at a given point in time. The "throughput" of a physical partition refers to the number of messages that arrive to the partition within a specific amount of time. Each "physical partition" stores an immutable collection or sequence of messages A message can be appended to a physical partition but a message cannot be deleted from the physical partition. In certain examples, a physical partition may be represented as an ordered append-only log of "message batches" with an explicitly configured retention period. In certain examples, messages in a "physical partition" may be stored in a file in a data repository (e.g., a file system) and managed by the physical node (or broker node) that the physical partition resides in.

In certain embodiments, each physical node (e.g., 212A) executes a multiplexing service (e.g., 204). Multiplexing service 204 is a physical process which resides locally on each physical node in a physical cluster of nodes. In certain embodiments, and as will be described in detail below, multiplexing service 204 may be configured to perform the efficient reading and writing of messages to different logical partitions in a physical partition on a physical node. In certain embodiments, multiplexing service 204 can support a set of one or more virtual nodes. The set of virtual nodes collectively make up a virtual cluster of nodes. For instance, in the embodiment shown in FIG. 2, multiplexing service 204 comprises a set of virtual nodes 118A . . . 118N that collectively make up a virtual cluster of nodes. Each virtual node is assigned a set of logical partitions that are mapped to a single physical partition on the physical node. As used herein, a "logical partition" is used to refer to a unit of storage on a physical partition in a physical cluster of nodes. A logical partition has lower data storage capacity than the physical partition it is stored on. In certain examples, the amount of provisioned throughput from a logical partition may also be lower than a physical partition. In certain embodiments, a physical partition can comprise (i.e., be divided into) multiple logical partitions. In certain examples, messages having the same key may be published to the same logical partition on the physical partition. As used herein, the term "key" is used to refer to an identifier used to group/partition related messages in a message stream. For instance, the key can be an identifier that groups/partitions messages received from a particular customer of DMSS 102. In certain embodiments, all messages published (written) to a particular logical partition are stored on the same physical partition.

The number of logical partitions assigned to a virtual node in a virtual cluster is a pre-configurable value that may be determined by DMSS 102 as part of its streaming services. Each virtual node is limited to the throughput capacity of its backing physical partition. The number of logical partitions which can be hosted on a virtual node is based on the aggregate of the throughput of the logical partitions, where the aggregate is less than that of its corresponding physical partition. For instance, if a logical partition has the same throughput as the physical-partition's capacity, then the virtual node is assigned only one logical partition. If a logical partition has near-zero throughput, then there is space for a significant number of logical partitions on a physical partition. By way of example, if a physical-partitions' throughput limit is 12 mb/sec and each logical partition is using only a throughput of 10 kb/sec, a virtual node in a virtual cluster of nodes can support up to 1200 virtual partitions. Since each physical partition (e.g., 210A, 210M) is now capable of storing and processing messages assigned to different logical partitions, a physical cluster of nodes (e.g., 120A) can now handle a significantly larger number of partitions than what was capable with traditional physical clusters which typically had physical limitations on the number of physical partitions they could support, the amount of throughput they could handle or the amount of storage they could retain.

In certain examples, each virtual node (e.g., 118A) within multiplexing service 204 comprises logical partition assignment information 202, mapping information 206 and a summary index 208. In certain examples, information related to the logical partitions assigned to a virtual node (e.g., 118A) may be stored as part of logical partition assignment information (e.g., 202) in each virtual node. Mapping information 206 comprises information that maps the logical partitions assigned to a virtual node to a physical partition on a physical node. Summary index 208 is a data structure that may be used by multiplexing service 204 to enable the efficient reading of messages stored in different logical partitions on a physical partition. Additional details related to the operations performed by multiplexing service 204 to enable the efficient reading of messages using summary index 208 is discussed in detail in FIG. 3 and FIG. 5.

In certain examples, different virtual nodes (e.g., 118A, 118N) in a virtual cluster of nodes can be mapped to different physical partitions (e.g., 210A, 210N) within a physical node (e.g., 212A). In certain examples, all the logical partitions assigned to a virtual node (e.g., 118A) in a virtual cluster of nodes can be mapped to the same physical partition on a physical cluster of nodes (e.g., 120A). In other examples, the logical partitions assigned to a virtual node (e.g., 118A) can be mapped to different physical partitions on a physical cluster of nodes.

Returning to the discussion of FIG. 1, different customers 104A-104N may interact with DMSS 102 to utilize various stream management services provided by DMSS 102. Customers 104A-104N may generally represent business entities, financial institutions or different tenants within a virtual cloud environment supported by DMSS 102. For example, a customer 104A may represent a business entity such as an online retail store that supports various activities such as processing online sales orders, managing the inventory of items, communicating with suppliers and so on. A customer 104B may represent a financial institution that handles thousands of credit card transactions from its subscribers every day. In certain embodiments, customers 104A-104N can utilize the services provided by DMSS 102 for efficiently handling continuous high-volume streams of data resulting from various activities and transactions occurring within their enterprises.

In certain embodiments, customers 104A-104N may interact with DMSS 102 using client devices that are communicatively coupled to DMSS 102 possibly via one or more communication networks. The client devices may be of various types, including but not limited to, a mobile phone, a tablet, a desktop computer, and the like. Customers 104A-104N may interact with DMSS 102 using an application (e.g., a browser application) executed by the client device or via REST APIs provided by DMSS 102 to utilize various stream management services provided by DMSS 102. For example, customers 104A-104N may, via a stream creation API, create streams for handling high volumes of data resulting from activities and transactions occurring in their enterprises. As part of stream creation, customers 104A-104N can create streams with a certain number of partitions. The number of partitions created for a stream may depend on the specific requirements of individual customers. For instance, a customer C1 104A may represent a business entity that wishes to distribute separate tasks to its fleet of workers and so may therefore may want to create a separate stream partition for each worker in the fleet where each stream partition can handle messages related to the tasks performed by an individual worker in the fleet. In other examples, a customer C2 104B may create different partitions for a stream, where each stream partition is capable of handling events of a specific type. Or, for example, a customer C3 104C may wish to create streams for each of its subscribing customers to store transactions relating to each customer in a separate stream and so may require partitions to be created for each subscribing customer. In some examples, a customer may wish to create a production-like stream configuration for use in its development, beta, and gamma environments and thus use different stream partitions for each separate environment.

In certain embodiments, a gateway service 112 within DMSS 102 may be configured to receive the stream creation requests 106 from customers 104A-104N. In certain examples, the stream creation requests 106 may be received by a load balancer 108 before being directed to gateway service 110. Load balancer 108 may be configured to perform load balancing of the requests by allowing only a certain number stream creation requests to be processed by gateway service 112 at a given point in time. Gateway service 112 receives the steam creation request and identifies the number of partitions to be created for the stream. Based on the number of requested partitions, gateway service 112 assigns a corresponding number of logical partitions to the stream. Thus, in certain examples, a stream may represent a static collection of logical partitions. In certain examples, the assignment of the logical partitions involves the identification or selection of a virtual node (e.g., 118A) on the virtual cluster of nodes from where the logical partitions can be assigned. The identification or selection of a virtual node by gateway service 112 may depend on the order in which the stream creation requests arrive to it. For instance, gateway service 112 may assign a set of logical partitions supported by a first virtual node (e.g., 118A) in the set of virtual clusters (118A-118N) for a first stream creation request that it receives. In certain embodiments, gateway service 112 may assign all logical partitions for a stream creation request from the same virtual node. In certain embodiments, gateway service 112 may employ a partitioning scheme that uses a message's key so that messages with the same key are assigned to the same logical partition. For example, gateway service 112 may utilize a partitioning scheme that calculates a partition ID of the stream from the message key so that messages that share a key may be assigned to the same logical partition.

After creating streams as described above, customers 104A-104N can begin publishing messages to the streams. In certain examples, a customer (e.g., 104A) can publish messages to a stream by sending a "produce/publish" request 108 to DMSS 102. For instance, a customer 104A may send a "produce/publish" request 108 via a browser application of DMSS 102 or via an API provided by DMSS 102 to publish messages to the stream. In certain embodiments, the "produce/publish" request 108 may be received by load balancer 108 before being directed to gateway service 110. Load balancer 108 may perform load balancing of the "produce/publish" requests by allowing only a certain number of requests to reach gateway service 112. Gateway service 112 receives the "produce/publish" request 108 and based on the message key associated with the messages in the request, identifies the logical partition assigned to the message. Then gateway service 112 identifies the appropriate virtual node in a virtual cluster of nodes to route the request to. For instance, gateway service 112 may utilize information stored in high available map 122 to determine the virtual node to route the request to. In certain embodiments, high available map 122 stores information that contains mapping data for the logical partitions to which gateway service 112 refers to and the corresponding virtual node in a virtual cluster of nodes that supports the assigned logical partitions. For instance, gateway service 112 may identify, based on a message key associated with the message, that the message is assigned to a logical partition (LP1) on a virtual node 118A.

In certain examples, gateway service 112 partitions the messages in "produce/publish" request 108 into one or more partitioned message batches per the logical partition. Gateway service 112 then batches the partitioned message batches together, per the identified virtual node on the virtual cluster and sends the message batch to the identified virtual node. The multiplexing service (e.g., 204) executing on the virtual node receives the message batch and appends header information to each partitioned message batch in the message batch by determining the backing physical-partition (also referred to herein as stream-extent or just "extent") corresponding to the partitioned message batch. In certain examples, the header information may include the address of the physical partition on the physical node that is configured to store messages associated with the partitioned message batch. Then, the multiplexing service writes the updated partitioned message batch (which includes the header information) to the identified logical partition on the physical partition. In certain examples, multiplexing service 204 returns published metadata pertaining to the produced partitioned message batch to the customer. The metadata may include, for instance, the stream identifier, the partition identifier (i.e., the logical partition identifier), and partition message offsets of the produced messages to the customer. As used herein, a message offset is used to refer to a message identifier (or a message position) of a message in the message batch stored in the logical partition.

In certain examples, the same instance of multiplexing service 204 may be configured to receive multiple "produce/publish" requests 108 from gateway service 112 by being able to listen to each request on a different port. Each port on which the multiplexing service 204 listens to is a virtual node on a virtual cluster. By way of example, on a physical cluster of physical nodes, each virtual node can listen on multiple ports such that virtual node 1 lives on physical node 1:49001, virtual node 2 lives on physical node 2:49001, virtual node 3 lives on physical node 3: 49001, virtual node 4 lives on physical node 1:49002, virtual node 5 lives on physical node 2:49002 and virtual node 6 lives on physical node 3:49002. Virtual nodes 1, 2, and 3 are part of virtual cluster 1 and virtual nodes 4, 5, and 6 are part of virtual cluster 2. In this example, gateway service 112 can connect to "server: 49001" to communicate with a first virtual node (118A) on a virtual cluster of nodes, connect to "server: 49002" to communicate to a different virtual node (118N) on the virtual cluster and so on.

In certain embodiments, gateway service 112 (via load balancer 110) may be configured to receive "fetch requests" 128 from customers 104A-104N to retrieve stored messages associated with message streams. For instance, a customer (104A) may issue a "fetch request" 128 via an API provided by DMSS 102 by specifying a stream identifier, a partition identifier, a message offset to start reading the messages in the message stream and optionally a message limit. Gateway service 112 identifies the logical partition (for e.g., based on the partition identifier) assigned to store the messages received via the message stream, identifies the appropriate virtual node in a virtual cluster of nodes to route the request to and transmits the "fetch request" containing the stream identifier, the partition identifier and the message offset to the virtual node. The virtual node (e.g., 118A) receives the "fetch request" and the multiplexing service (e.g., 204) executing in the virtual node determines the requests' backing physical-partition (often referred to as stream-extent or just "extent") based on mapping information 206. Multiplexing service 204 then consults summary index 208 to determine the message offset from which to consume messages stored in the physical partition. Multiplexing service 204 issues an internal fetch request to retrieve response data from the physical partition. In certain embodiments, multiplexing service 204 performs a set of operations to enable the efficient retrieval of the messages stored in different partition chunks of a physical partition by filtering out partition chunks that do not contain messages associated with the logical partition identified in the fetch request. The response data returns a subset of messages stored on the logical partition in the physical partition and potentially a subsequent request is sent to the backing partition if warranted. The gateway service then adapts the internal response to a customer-response and returns the response 130 to the customer. Additional details relating to the operations performed by multiplexing service 204 for enabling the efficient reading (fetching) messages using summary index 208 and mapping information 206 is discussed in detail in FIG. 5.

In certain embodiments, DMSS 102 comprises a heat management service 126. Heat management service 126 is used to monitor the workload (or resource utilization) of the different physical partitions within the physical clusters 120A-120M. Since, each physical partition can be configured with a variable number of logical partitions, each physical partition may experience different resource utilization (i.e., emit variable heat) values. In certain examples, heat management service 126 may be used to collect and aggregate resource utilization metrics from the multiplexing service and correlate the metrics with data stored in the physical clusters.

In certain embodiments, DMSS 102 comprises a high available map 122. In addition to storing mapping information as discussed above, high available map 122 may also include information about the different customers (104A-104N) of DMSS 102. For instance, high available map 122 may comprise information identifying the logical partitions on a physical partition that store messages related to a particular customer (e.g., 104A) of DMSS 102. In certain embodiments, high available map 122 may access information stored in metadata storage 124. Metadata storage 124 may store portions of data or information used by or generated by DMSS 102 as part of its processing. For instance, metadata storage 124 may store logical partition assignment information (e.g., 206) assigned to each virtual node, mapping information (e.g., 206) that maps logical partitions to physical partitions in a physical cluster and so on.

Computing environment 100 depicted in FIG. 1 is merely an example and is not intended to unduly limit the scope of claimed embodiments. Various alternatives and modifications are possible. For example, in some implementations, DMSS 102 can be implemented using more or fewer subsystems than those shown in FIG. 1, may combine two or more subsystems, or may have a different configuration or arrangement of subsystems.

Figure 3:
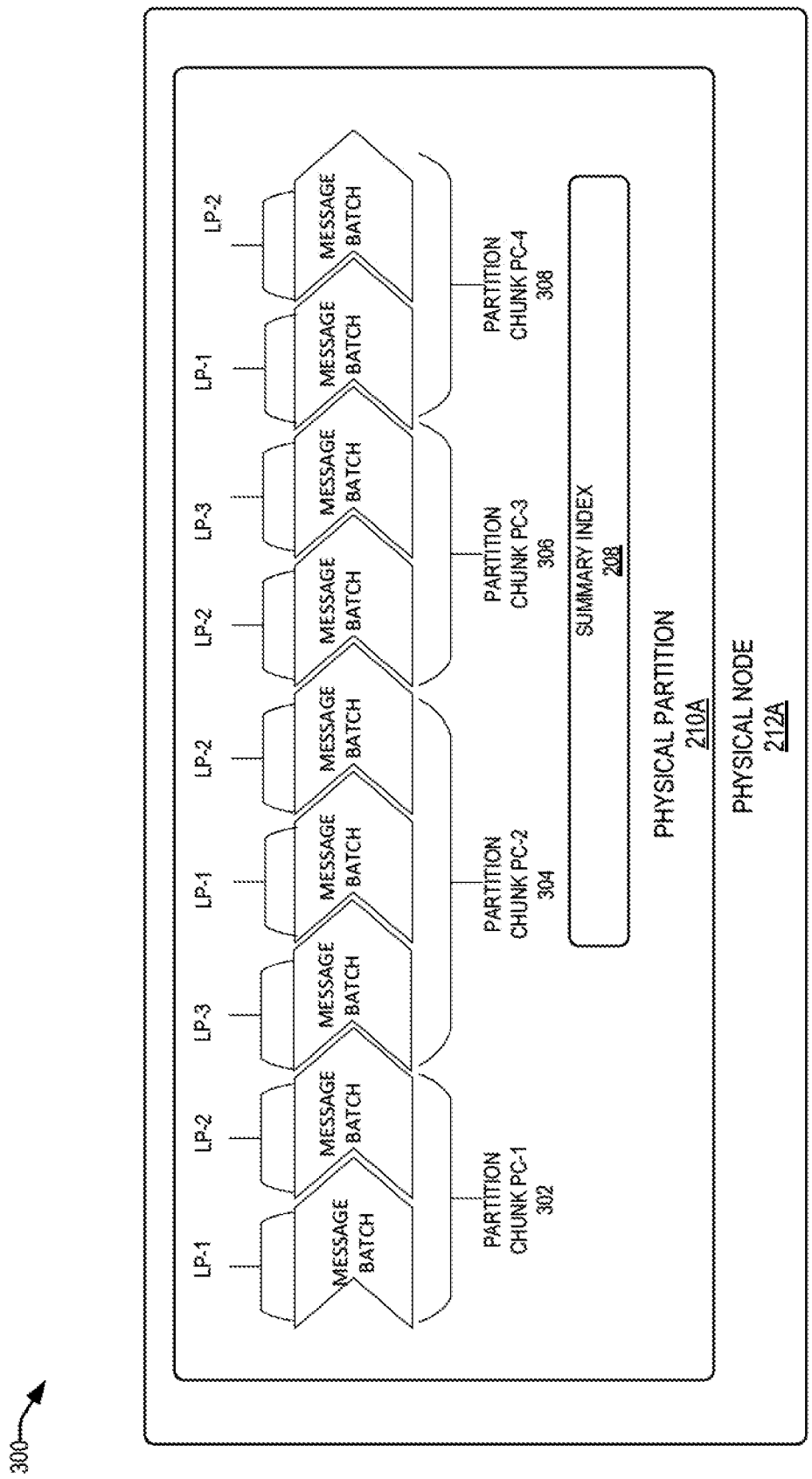
FIG. 3 is an exemplary illustration of partition chunks and logical partitions composed within a physical partition on a physical node in a physical cluster of nodes, according to certain embodiments.

FIG. 3 is an exemplary illustration of partition chunks and logical partitions composed within a physical partition on a physical node in a physical cluster of nodes, according to certain embodiments. In certain embodiments, a physical partition 210A (also referred to herein a "stream extent" or just an "extent") may be divided into multiple partition chunks. Each partition chunk is configured to store a fixed and/or a minimum size of a contiguous set of one or more partitioned message batches where each partitioned message batch comprises messages between a range of message offsets. The fixed or minimum size of each partitioned message batch may be determined by DMSS 102 as part of its streaming services. For instance, the size of each partitioned message batch within a physical partition may be determined based on the throughput and storage capacity of its physical partition. In certain examples, each partition chunk may be composed of one or more logical partitions and each logical partition may be configured to store a partitioned batch of messages. Each partitioned message batch comprises metadata associated with messages in the message batch such as the message timestamp, message size, the message offset (message id) and minimum/maximum offset of messages in the message batch. In certain examples, this metadata may be stored as part of mapping information 206 in multiplexing service 204. In the embodiment depicted in FIG. 3, physical partition 210A is divided into four partition chunks PC-1 302, PC-2 304, PC-3 306 and PC-4 308. Partition chunk PC-1 302 is composed of partitioned message batches associated with logical partitions LP-1 and LP-2 respectively, partition chunk PC-2 is composed of partitioned message batches associated with logical partitions LP-3, LP1 and LP-2 respectively, partition chunk PC-3 is composed of partitioned message batches associated with logical partitions LP-2 and LP-3 respectively and partition chunk PC-4 is composed of partitioned message batches associated with logical partitions LP-1 and LP-2 respectively. The size limit of a partition chunk may be pre-configured by streaming data storage manager 116 during the stream creation process. In a certain implementation, the size limit of a partition chunk is 1 MB. While the embodiment shown in FIG. 3 illustrates a physical partition divided into four partition chunks, where each partition chunk is composed of partitioned message batches associated with one or more logical partitions (LP-1, LP-2 or LP-3), in alternate embodiments, physical partition 210A may be composed of more or fewer logical partitions and more or fewer partition chunks.

As discussed in relation to FIG. 1, when multiplexing service (e.g., 204) receives a "publish request" message 108 from gateway service 112 to write a partitioned message batch (associated with a particular logical partition) to an identified physical partition on the physical node, the partitioned message batch is written to a specific partition chunk in the physical partition. In certain embodiments, multiplexing service 204 identifies the particular partition chunk in the physical partition to write a partitioned message batch based on the order in which it receives partitioned message batches. By way of example, multiplexing service 204 may write a first partitioned message batch (received via a first "publish request") associated with a first logical partition (e.g., LP-1) to a first partition chunk in the physical partition. When a second partitioned message batch (received via a second "publish request") associated with a different logical partition (e.g., LP-2) is received, multiplexing service 204 may write the second partitioned message batch to the same (i.e., first) partition chunk if the size limit of the first partition chunk is not yet reached. If the minimum size limit of the first partition chunk is reached, then multiplexing service 204 may write the second partitioned message batch to a different (e.g., a second) partition chunk in the physical partition. In one example, the minimum size limit of a partition chunk is at least 1 MB. In certain examples, summary index 208 in multiplexing service 204 is configured to maintain an ordered-list of partition chunks associated with a physical partition (e.g., 210A) in a physical node (212A). The summary index is updated after a partition chunk is appended with a message batch.

In certain examples, the writing of partitioned message batches to different partition chunks in a physical partition may result in the interleaving of partitioned message batches associated with different logical partitions in the physical partition. As noted above, in certain embodiments, each logical partition may be configured to store messages related to a different customer of the distributed message streaming system. For instance, in the embodiment shown in FIG. 3, a first partition chunk PC-1 may store a first partitioned message batch associated with logical partition LP-1 followed by a second partitioned message batch associated with logical partition LP-2 where LP-1 may comprise messages received from a first customer (e.g., 104A shown in FIG. 1) and LP-2 may comprise messages received from a second customer (e.g., 104B shown in FIG. 1) and where the first customer is different from the second customer. Similarly, a second partition chunk PC-2 may store a first partitioned message batch associated with a third logical partition LP-3 where LP-3 may comprise messages received from a third customer (e.g., 104C shown in FIG. 1) that is different from both the first customer and the second customer. Additional details of the operations performed by the multiplexing service for writing different partitioned message batches to different partition chunks within a physical partition is described in FIG. 4.

Figure 4:
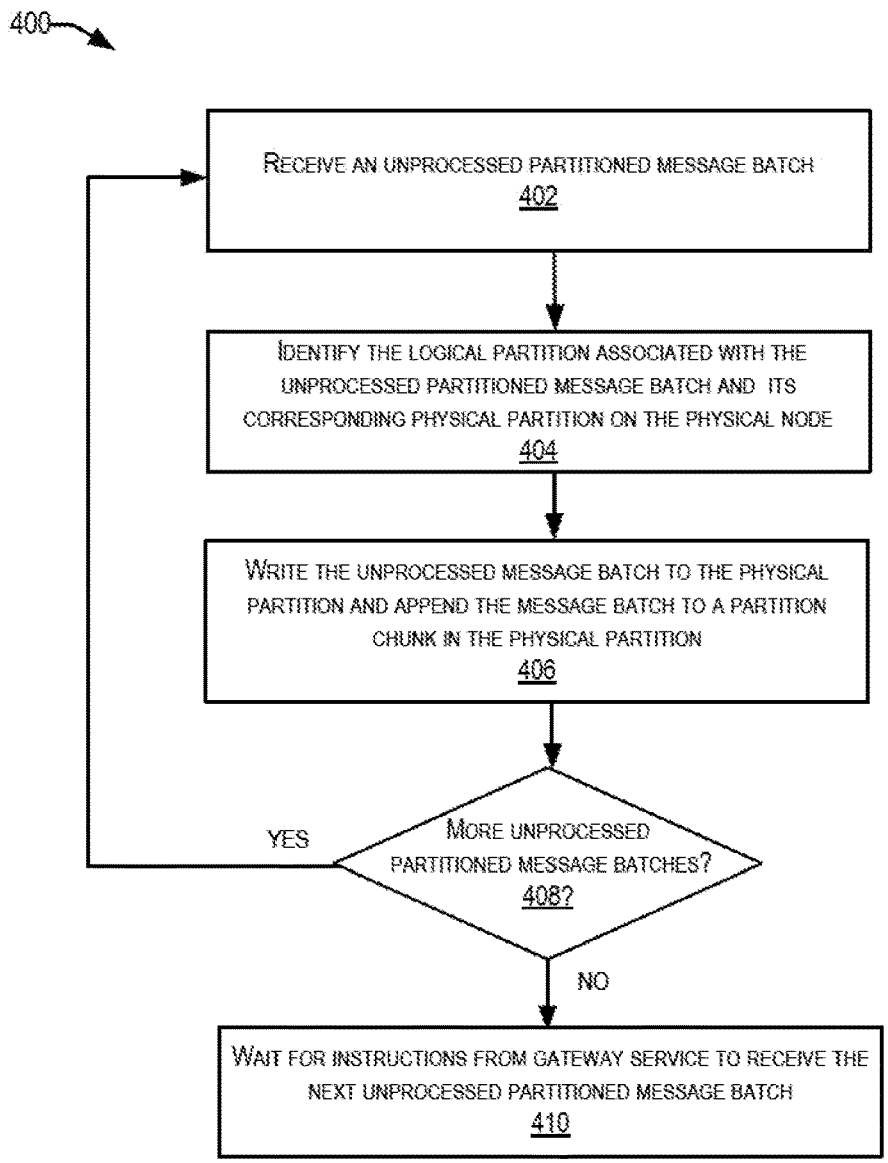
FIG. 4 is a flowchart describing operations performed by multiplexing service shown in FIG. 2 for writing partitioned message batches associated with different logical partitions to different partition chunks of a physical partition, according to certain embodiments.

FIG. 4 is a flowchart describing operations performed by multiplexing service shown in FIG. 2 for writing partitioned message batches associated with different logical partitions to different partition chunks of a physical partition, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by multiplexing service 204 depicted in FIG. 2.

In certain embodiments, the processing depicted in FIG. 4 is initiated at block 402 when a multiplexing service (e.g., 204) receives an unprocessed partitioned message batch from gateway service (e.g., 112).

At block 404, multiplexing service 204 identifies the logical partition associated with the unprocessed partitioned message batch and its corresponding physical partition on the physical node. For instance, multiplexing service 204 may utilize mapping information 206 to identify the logical partition and associated physical partition for the unprocessed partitioned message batch.

At block 406, multiplexing service 204 writes the unprocessed message batch to the physical partition and appends the unprocessed message batch to a partition chunk in the physical partition. If the partition chunk has reached its maximum size limit, a new partition chunk in the physical partition is created for writing the messages in the message batch.

At block 408, multiplexing service 204 determines if there are more unprocessed partitioned message batches. If there are more unprocessed partitioned message batches, then the process loops back to block 402 to receive the next unprocessed partitioned message batch. If there are no more unprocessed partitioned message batches, then, in certain embodiments, at block 410, multiplexing service 204 waits for instructions from gateway service 112 to receive the next unprocessed partitioned message batch.

As noted above, in certain examples, multiplexing service 204 may be configured to store metadata associated with partition chunks in a physical partition as part of mapping information 206 in multiplexing service 204. In a certain implementation, the mapping information may be stored in a mapping table and persisted by multiplexing service 204. An exemplary mapping table generated by multiplexing service 204 for a physical partition P1 is shown below:

| Mapping Table | | | |
|---|---|---|---|
| Ordered list of partition chunk (PC) identifiers | Logical Partition identifiers composed in partition chunk | Message offset range for partitioned message batches composed in logical partitions of partition chunk | Physical Partition |
| PC-1 | LP-1, LP-2 | LP-1: (0 . . . 10) LP-2: (0 . . . 10) | P1 |
| PC-2 | LP-3, LP-1, LP-2 | LP-3: (0 . . . 10) LP-1: (11 . . . 20) LP-2: (11 . . . 20) | P1 |
| PC-3 | LP-2, LP3 | LP-2: (21 . . . 30) LP-3: (11 . . . 20) | P1 |
| PC-4 | LP-1, LP-2 | LP-1: (21 . . . 30) LP-2: (31 . . . 40) | P1 |

In the example table above, the mapping table is organized into one or more columns including a partition chunk identifier column, a logical partition identifier column, a message offset range column and a physical partition column. The partition chunk identifier column is an ordered list of partition chunks in a physical partition and identifies the partition chunk identifier associated with the partition chunk. The logical identifier column uniquely identifies the logical partitions composed in a partition chunk. The message offset range column identifies the offset range (min offset-max offset) of the messages in a partitioned message batch (associated with a logical partition) in the partition chunk. The physical partition column uniquely identifies the physical partition that is associated with the partition chunk. The illustrated mapping table is merely an example and is not intended to unduly limit the scope of claimed embodiments. One of ordinary skill in the art would recognize many possible variations, alternatives, and modifications. For example, in some implementations, the mapping table can be implemented using more or fewer columns than those shown in FIG. 1, may combine two or more columns of information, or may have different columns than shown in the illustration.

Figure 5:
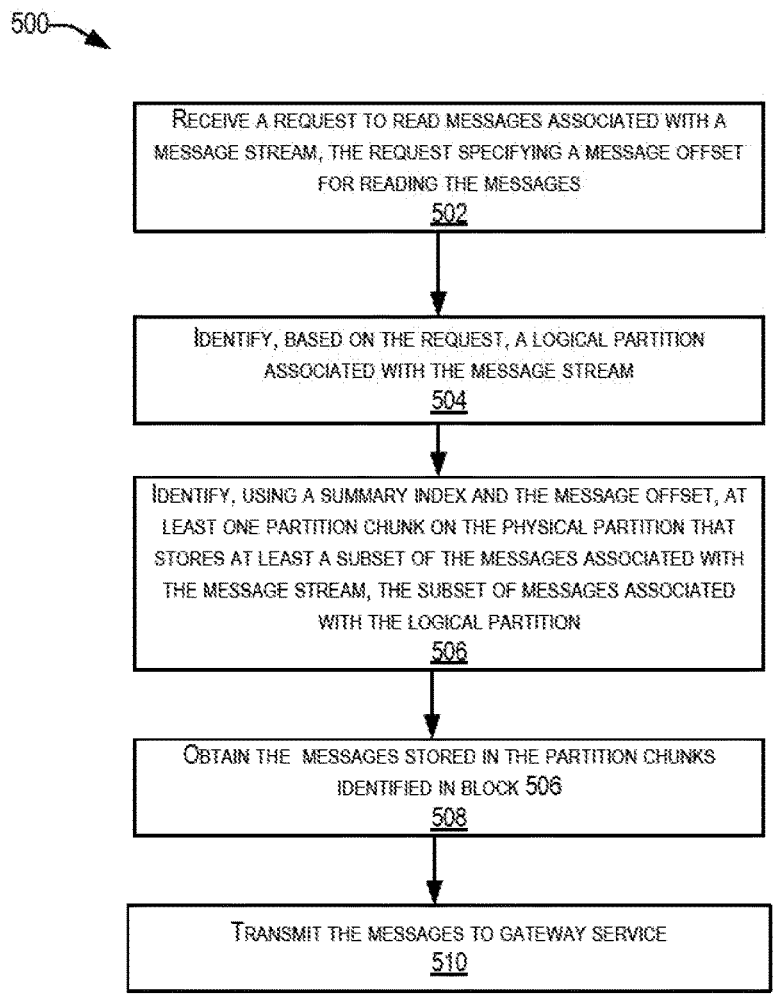
FIG. 5 is a flowchart describing operations for efficiently reading messages from a logical partition associated with a partition chunk in a physical partition, according to certain embodiments.

FIG. 5 is a flowchart describing operations for efficiently reading messages from a logical partition associated with a partition chunk in a physical partition, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by a multiplexing service in streaming data storage manager 116 depicted in FIG. 1.

In certain embodiments, the processing depicted in FIG. 5 is initiated at block 502 when multiplexing service (e.g., 204) receives a request to read messages associated with a message stream. In certain examples, and as discussed in FIG. 1, the request may represent a "fetch request" transmitted to the multiplexer service by the gateway service (e.g., 112) and may specify a stream identifier, a partition identifier, a message offset to start reading the messages in the message stream and optionally a message limit. As used herein, the "message offset" is used to refer to a position or an identifier of the message in the message stream.

At block 504, multiplexing service 204 identifies the logical partition associated with the message stream and its corresponding physical partition on a physical cluster. For instance, multiplexing service 204 may utilize mapping information 206 (e.g., stored in mapping table illustrated above) to identify the logical partition from the partition identifier associated with the request and the corresponding physical partition associated with the identified logical partition.

At block 506, multiplexing service 204 identifies, using a summary index and the message offset, at least one partition chunk on the physical partition that stores at least a subset of the messages associated with the message stream. As part of the processing performed in block 506, multiplexing service 204 may use mapping information (e.g., 206) which may be stored as part the mapping table (Table-1 illustrated above) to search for and identify a first partition chunk that stores at least a subset of the messages associated with the message stream. By way of example, if the logical partition identified in block 504 for the message stream is LP-1 and the message offset specified in the request is 11, multiplexing service 204, using summary index (e.g., 208) and the message offset can identify that partition chunk PC-2 is the first partition chunk stores at least a subset of messages of the message stream from message offset 11 in a partitioned message batch that is associated with the logical partition LP-1.

In certain embodiments, as part of the processing performed in block 506, multiplexing service 204 may determine, based on the request, that there are additional messages to be read. For instance, in certain examples, the request may specify that messages up to a particular specific message limit (e.g., 1 MB) from the message stream are to be read. If the multiplexer service determines that there are additional messages to be read, in certain examples, at block 506, multiplexer service 204 identifies, using the summary index, the next partition chunk on the physical partition that stores at least a subset of the messages associated with the message stream. For instance, based on the above example, multiplexing service may utilize the summary index to identify that the next partition chunk that stores at least a subset of messages of the message stream in a partitioned message match is PC-4.

Thus, the use of the summary index enables the multiplexing service to efficiently search for partition chunks that contain subsets of messages (e.g., in one or more partitioned message batches) of the message stream by "jumping" directly to the identified partition chunks that store the messages and skipping partition chunks that do not store messages from the message offset specified in the request for the message stream. This reduces the amount of the physical partition that needs to be read by the multiplexing service to handle the read (fetch) request and in turn improves the overall performance of the distributed message streaming system.

At block 508, multiplexing service 204 obtains the messages stored in the partition chunks identified in block 506.

At block 510, multiplexing service 204 transmits the messages to the gateway service. The gateway service then generates a response 130 with the requested messages to the customer that issued the read request.

The present disclosure addresses several deficiencies of certain distributed storage systems by including improved capabilities for increasing the number of partitions that customers can allocate and use for their streams while minimizing the physical footprint of these partitions on the storage clusters. The disclosed approach enables a customer to create as many partitions for their streams as they desire without regard for utilizing those partitions by creating the partitions as different logical partitions on a physical partition in a physical cluster of the distributed message streaming system. Since each physical partition is now capable of supporting multiple lower throughput logical partitions, each physical cluster is capable of handling a larger number of partitions than what was capable with traditional physical clusters that have physical limitations on the number of partitions they can support, the amount of throughput they can handle and the amount of storage they can retain.

The distributed message streaming system also provides an improved and efficient process for reading messages stored on a logical partition within a physical partition. The distributed message streaming system can efficiently search for and identify partition chunks in a physical partition that comprise subsets of messages associated with a logical partition by filtering out partition chunks that do not contain messages associated with the logical partition. By using the disclosed technique, the distributed message streaming system is able to reduce the amount of the physical partition that needs to be read for retrieve messages stored in different logical partitions on a physical partition thereby improving the overall performance of the distributed message streaming system.

Example Implementation

Figure 6:
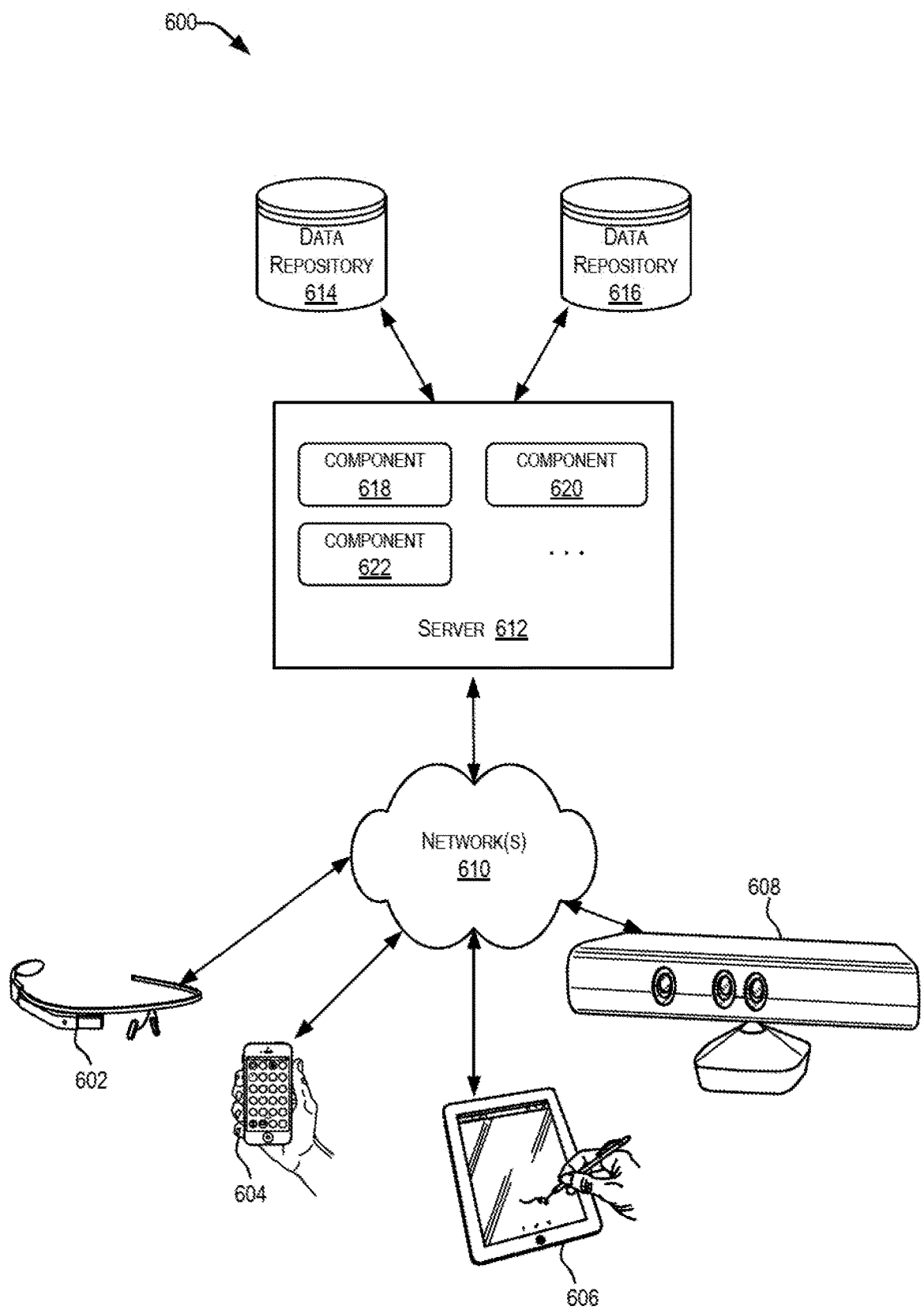
FIG. 6 depicts a simplified diagram of a distributed system for implementing one of the embodiments.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the processing described in this disclosure.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to interact with server 612 in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®, tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store data or information generated by the processing described herein and/or data or information used for the processing described herein. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

Figure 7:
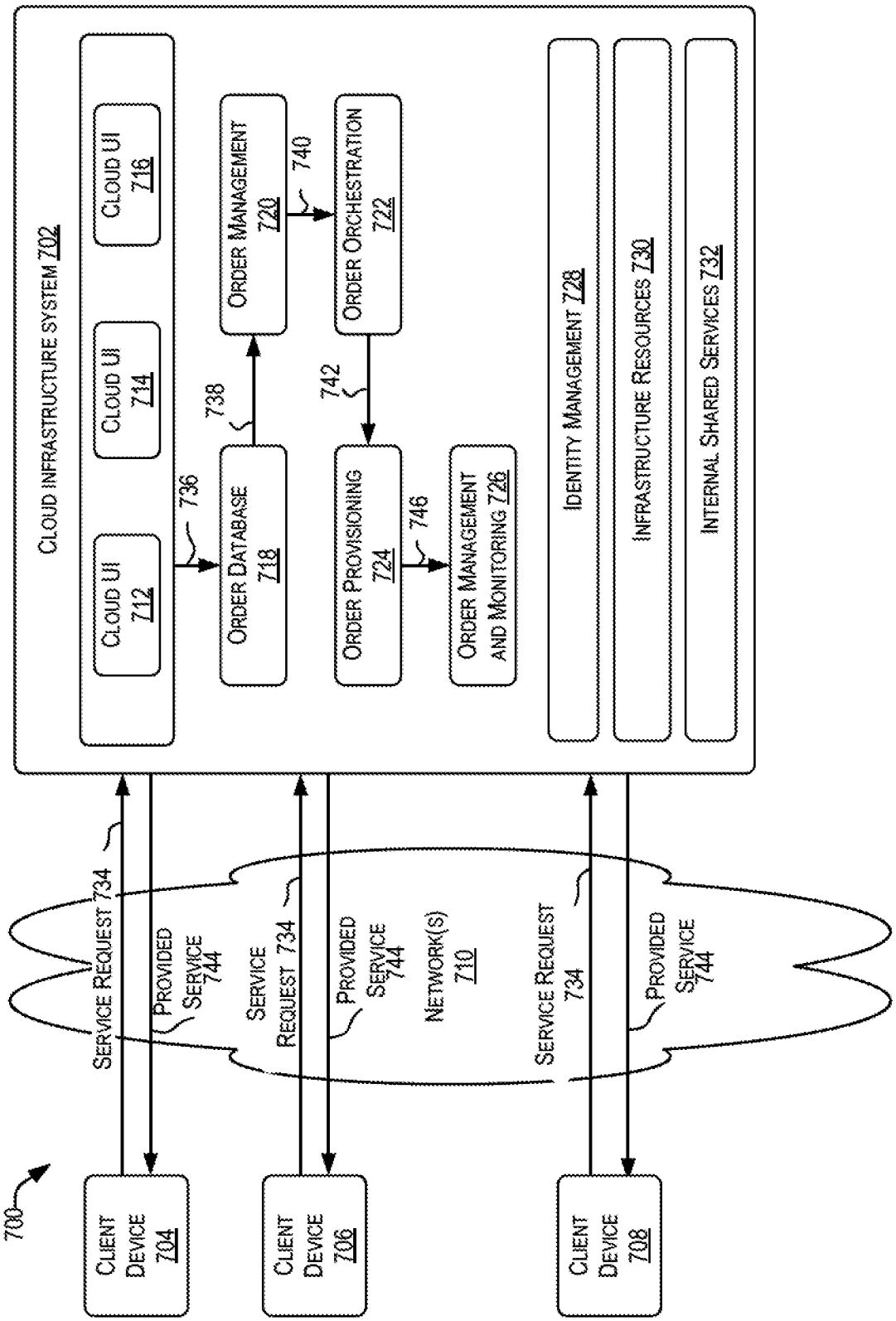
FIG. 7 is a simplified block diagram of a cloud-based system environment in which functionalities described herein may be offered as cloud services, in accordance with certain embodiments.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the disclosure. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 802, 804, 806, and 808.

Although example system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet or from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In example operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702. At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
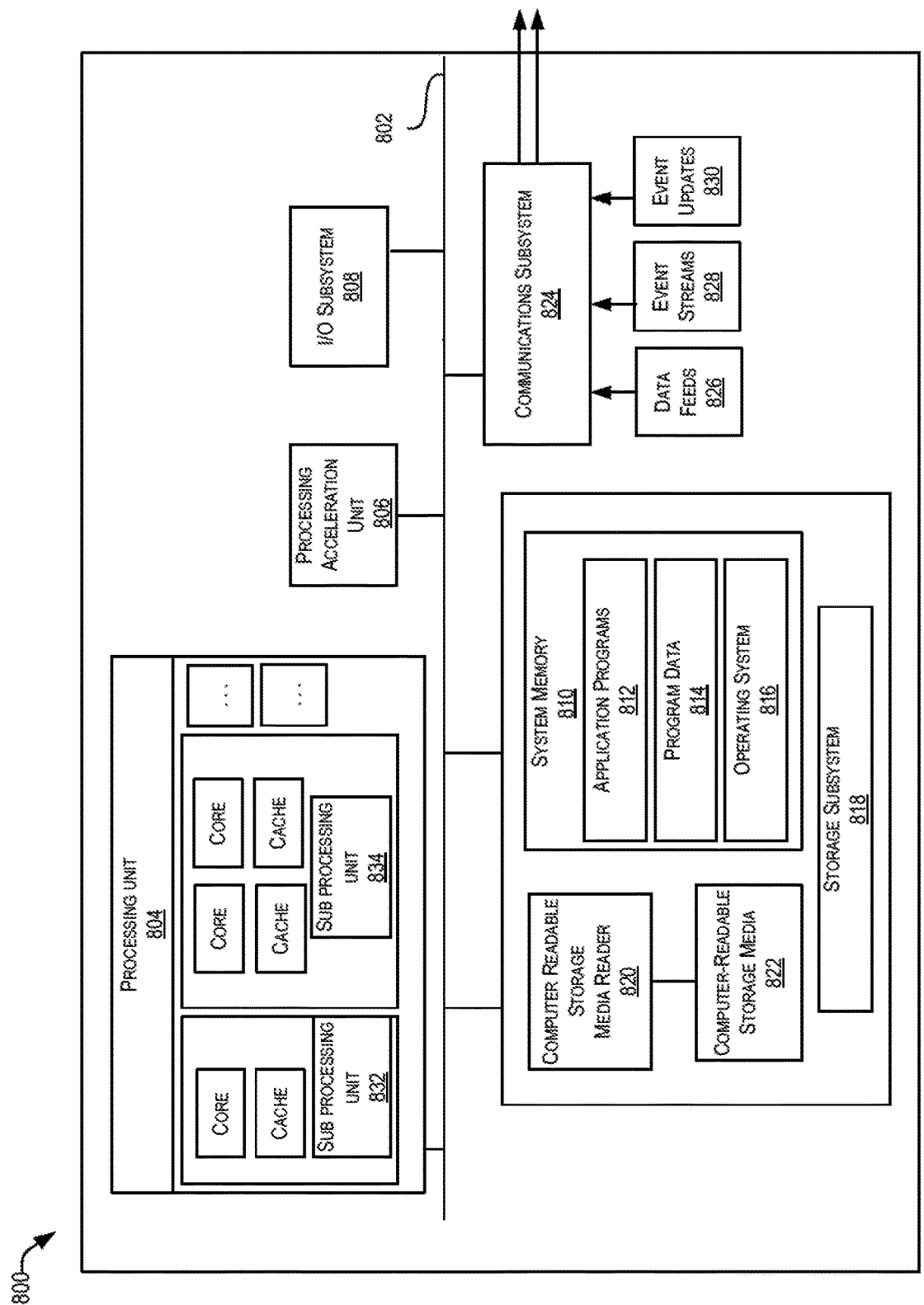
FIG. 8 illustrates an exemplary computer system, in which various embodiments of the present disclosure may be implemented.

FIG. 8 illustrates an exemplary computer system 800 that may be used to implement certain embodiments. For example, in some embodiments, computer system 800 may be used to implement any of the system and subsystems for performing processing according to the present disclosure. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 860 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, at a computer system, a request to read a plurality of messages from a message stream, the request specifying a message offset for reading the plurality of messages;
identifying, by the computer system, and based at least in part on the request, a logical partition associated with the message stream, the logical partition comprised in a physical partition of a physical node, the physical node comprised in a physical cluster of nodes in a distributed message streaming system;
identifying, by the computer system, using the message offset and a summary index, at least one partition chunk on the physical partition that stores at least a subset of messages of the plurality of messages, wherein the subset of messages is associated with the logical partition, and wherein the at least one partition chunk comprises a set of one or more logical partitions that include the logical partition;
obtaining, by the computer system, at least the subset of messages stored in the at least one partition chunk; and
transmitting, by the computer system, at least the subset of messages to an application of the distributed message streaming system.

2. The method of claim 1, wherein identifying the at least one partition chunk on the physical partition comprises:
identifying a first partition chunk in the physical partition that stores at least the subset of messages of the plurality of messages associated with the logical partition, wherein identifying the first partition chunk comprises:
obtaining, by the computer system, mapping information for a set of one or more partition chunks associated with the physical partition; and
identifying, using the summary index, the message offset and the mapping information, the first partition chunk in the physical partition that stores at least the subset of messages of the message stream associated with the logical partition.

3. The method of claim 2, wherein the mapping information identifies, for a partition chunk in the set of one or more partition chunks associated with the physical partition, a set of one or more logical partitions within each partition chunk and a message offset range for a subset of messages stored within each logical partition.

4. The method of claim 2, further comprising:
determining, by the computer system, that there are additional messages to be read in the plurality of messages in the message stream; and
based at least in part on the determining, using the summary index and the mapping information to identify at least a second partition chunk in the physical partition that stores at least a subset of the additional messages of the plurality of messages associated with the logical partition.

5. The method of claim 4, wherein the first partition chunk and the second partition chunk are not contiguous partition chunks stored in the physical partition.

6. The method of claim 1, wherein the at least one partition chunk on the physical partition is composed of a set of one or more logical partitions, wherein a first logical partition in the set of logical partitions in the at least one partition chunk is different from a second logical partition in the set of logical partitions in the at least one partition chunk.

7. The method of claim 6, wherein the first logical partition stores a first subset of messages of the distributed message streaming system and the second logical partition stores a second subset of messages of the distributed message streaming system.

8. The method of claim 7, wherein the first subset of messages is different from the second subset of messages.

9. The method of claim 1, wherein the at least one partition chunk in the physical partition stores a fixed size of one or more contiguous subsets of messages of the plurality of messages in the message stream, wherein each message subset comprises messages between a range of message offsets.

10. The method of claim 1, further comprising:
receiving, by the computer system, a publish message request to publish a set of one or more messages in a message batch associated with the message stream, the publish message request received prior to the request to read the plurality of messages of the message stream.

11. The method of claim 10 further comprising:
identifying, by the computer system, the logical partition associated with the message batch;
identifying, by the computer system, the physical partition on the physical node that is mapped to the logical partition;
writing the set of one or more messages in the message batch to the physical partition; and
appending the message batch to the at least one partition chunk in the physical partition.

12. A system comprising:
a memory; and
one or more processors configured to perform processing, the processing comprising:
receiving a request to read a plurality of messages from a message stream, the request specifying a message offset for reading the plurality of messages;
identifying, based at least in part on the request, a logical partition associated with the message stream, the logical partition comprised in a physical partition of a physical node, the physical node comprised in a physical cluster of nodes in a distributed message streaming system;
identifying using the message offset and a summary index, at least one partition chunk on the physical partition that stores at least a subset of messages of the plurality of messages, wherein the subset of messages is associated with the logical partition, and wherein the at least one partition chunk comprises a set of one or more logical partitions that include the logical partition;
obtaining at least the subset of messages stored in the at least one partition chunk; and
transmitting at least the subset of messages to an application of the distributed message streaming system.

13. The system of claim 12, wherein identifying the at least one partition chunk on the physical partition comprises:
identifying a first partition chunk in the physical partition that stores at least the subset of messages of the plurality of messages associated with the logical partition, wherein identifying the first partition chunk comprises:
obtaining mapping information for a set of one or more partition chunks associated with the physical partition; and
identifying, using the summary index, the message offset and the mapping information, the first partition chunk in the physical partition that stores at least the subset of messages of the message stream associated with the logical partition.

14. The system of claim 12, wherein the at least one partition chunk on the physical partition is composed of a set of one or more logical partitions, wherein a first logical partition in the set of logical partitions in a partition chunk is different from a second logical partition in the set of logical partitions in the partition chunk.

15. The system of claim 14, wherein the mapping information identifies, for a partition chunk in the set of one or more partition chunks associated with the physical partition, a set of one or more logical partitions within each partition chunk and a message offset range for a subset of messages stored within each logical partition.

16. The system of claim 15, wherein the first logical partition stores a first subset of messages of the distributed message streaming system and the second logical partition stores a second subset of messages of the distributed message streaming system.

17. The system of claim 16, wherein the first subset of messages is different from the second subset of messages.

18. A non-transitory computer-readable medium having program code that is stored thereon, the program code executable by one or more processing devices for performing operations comprising:

receiving a request to read a plurality of messages from a message stream, the request specifying a message offset for reading the plurality of messages;

identifying, based at least in part on the request, a logical partition associated with the message stream, the logical partition comprised in a physical partition of a physical node, the physical node comprised in a physical cluster of nodes in a distributed message streaming system;

identifying using the message offset and a summary index, at least one partition chunk on the physical partition that stores at least a subset of messages of the plurality of messages, wherein the subset of messages is associated with the logical partition, and wherein the at least one partition chunk comprises a set of one or more logical partitions that include the logical partition;

obtaining at least the subset of messages stored in the at least one partition chunk; and transmitting at least the subset of messages to an application of the distributed message streaming system.

19. The non-transitory computer-readable medium of claim 18 further comprising:

receiving a publish message request to publish a set of one or more messages in a message batch associated with the message stream, the publish message request received prior to the request to read the plurality of messages of the message stream.

20. The non-transitory computer-readable medium of claim 19 further comprising:

identifying the logical partition associated with the message batch;

identifying the physical partition on the physical node that is mapped to the logical partition;

writing the set of one or more messages in the message batch to the physical partition; and appending the message batch to a partition chunk in the physical partition.

* * * * *

UNITED STATES PATENT AND TRADEMARK OFFICE
CERTIFICATE OF CORRECTION

| | |
|---|---|
| PATENT NO. | : 11,507,584 B2 |
| APPLICATION NO. | : 16/932252 |
| DATED | : November 22, 2022 |
| INVENTOR(S) | : Roux et al. |

It is certified that error appears in the above-identified patent and that said Letters Patent is hereby corrected as shown below:

In the Specification

In Column 16, Line 34, delete "iPhone®," and insert -- iPhone®), --, therefor.

In Column 23, Line 48, delete "computer readable" and insert -- computer-readable --, therefor.

In Column 24, Line 21, delete "Google) Glass®." and insert -- Google Glass®). --, therefor.

In Column 26, Line 32, delete "evolution)," and insert -- evolution)), --, therefor.

Signed and Sealed this
Eighth Day of August, 2023

*Katherine Kelly Vidal*

Katherine Kelly Vidal
*Director of the United States Patent and Trademark Office*